United States Patent
Anwar et al.

(10) Patent No.: US 11,354,396 B2
(45) Date of Patent: Jun. 7, 2022

(54) AUTHENTICATION SYSTEMS USING SEQUENCES OF TILE SELECTIONS FROM A GRID

(71) Applicant: North Carolina Agricultural and Technical State University, Greensboro, NC (US)

(72) Inventors: Mohd Anwar, Greensboro, NC (US); Paul Biocco, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 358 days.

(21) Appl. No.: 16/518,477

(22) Filed: Jul. 22, 2019

(65) Prior Publication Data
US 2020/0026843 A1    Jan. 23, 2020

Related U.S. Application Data

(60) Provisional application No. 62/700,953, filed on Jul. 20, 2018.

(51) Int. Cl.
| | |
|---|---|
| *G06F 21/36* | (2013.01) |
| *G06F 21/88* | (2013.01) |
| *G06F 3/044* | (2006.01) |
| *G06F 21/40* | (2013.01) |

(52) U.S. Cl.
CPC ............ *G06F 21/36* (2013.01); *G06F 3/0446* (2019.05); *G06F 21/40* (2013.01); *G06F 21/88* (2013.01)

(58) Field of Classification Search
CPC .......... G06F 21/36; G06F 21/31; G06F 21/46; G06F 2221/2117; H04L 63/083; H04L 9/32; H04W 12/06
See application file for complete search history.

(56) References Cited

U.S. PATENT DOCUMENTS

| | | | | |
|---|---|---|---|---|
| 7,552,467 B2* | 6/2009 | Lindsay | ............... | G06F 21/31 726/5 |
| 8,117,458 B2* | 2/2012 | Osborn, III | ............. | G06F 21/36 713/183 |

(Continued)

OTHER PUBLICATIONS

Belenko & Sklyarov, "Secure Password Managers" and "Military-Grade Encryption" on Smartphones: Oh, Really? Blackhat Europe, 56 (2012).

(Continued)

*Primary Examiner* — Lizbeth Torres-Diaz
(74) *Attorney, Agent, or Firm* — Jenkins, Wilson, Taylor & Hunt, P.A.

(57) ABSTRACT

Methods, systems, and computer readable media for authenticating to a computer system. In some examples, a method includes receiving a request from a user device for authentication, the request specifying a username. The method includes determining grid information associated with the username by accessing a repository of grid information for usernames, the grid information specifying a color set. The method includes sending the color set to the user device, causing the user device to display a grid of colored tiles, each colored tile having a color specified by the color set. The method includes receiving a sequence of tile selections from the user device, each tile selection specifying a user selection of one of the colored tiles. The method includes granting or rejecting the request for authentication based on the sequence of tile selections and the grid information associated with the username.

14 Claims, 5 Drawing Sheets

(56) References Cited

U.S. PATENT DOCUMENTS

| | | | | |
|---|---|---|---|---|
| 8,176,332 | B2* | 5/2012 | Drake | G06F 21/34 |
| | | | | 713/184 |
| 9,009,814 | B1* | 4/2015 | Wertz | G06F 21/36 |
| | | | | 726/18 |
| 10,169,565 | B2* | 1/2019 | Zia | G06F 21/46 |
| 10,530,784 | B2* | 1/2020 | Bandi | H04L 63/0428 |
| 10,754,814 | B1* | 8/2020 | Li | H04L 29/06 |
| 2004/0230843 | A1* | 11/2004 | Jansen | G06F 21/36 |
| | | | | 726/7 |
| 2006/0031174 | A1* | 2/2006 | Steinmetz | H04L 9/3226 |
| | | | | 705/67 |
| 2008/0005035 | A1* | 1/2008 | Schwartz | G06F 21/31 |
| | | | | 705/325 |
| 2012/0023574 | A1* | 1/2012 | Osborn | H04L 9/3226 |
| | | | | 726/19 |
| 2019/0075120 | A1* | 3/2019 | Bandi | H04L 63/08 |
| 2020/0026843 | A1* | 1/2020 | Anwar | G06F 3/0446 |

OTHER PUBLICATIONS

Biddle et al., "Graphical passwords: Learning from the first twelve years." ACM Computing Surveys (CSUR), vol. 44, No. 4, pp. 1-41 (2012).

Chiasson et al., "Influencing users towards better passwords: persuasive cued click-points." People and Computers XXII Culture, Creativity, Interaction, vol. 22, pp. 121-130 (2008).

De Angeli et al., "Is a picture really worth a thousand words? Exploring the feasibility of graphical authentication systems," International journal of human-computer studies, 63(1-2), pp. 128-152 (2005).

Dimitropoulos, "GrIDsure: Effects of background images on pattern choice, usability and memorability," University College London, pp. 1-67 (2011).

Gontovnikas, "Is Passwordless Authentication More Secure Than Passwords?" Retrieved Mar. 23, 2020, from https://auth0.com/blog/is-passwordless-authentication-more-secure-than-passwords/, pp. 1-9.

Karole et al., "A comparative usability evaluation of traditional password managers." In International Conference on Information Security and Cryptology, pp. 233-251 (2010).

Renaud & De Angeli, "My password is here! An investigation into visuo-spatial authentication mechanisms." Interacting with computers, 16(6), pp. 1-25 (2004).

Renaud & Smith, "Jiminy: helping users to remember their passwords." South African Institute of Computer Scientists and Information Technologists Annual Conference (SAICSIT) 2001: Hardware, Software and Peopleware, pp. 73-80 (2001).

* cited by examiner

| Username | Email | ClickSequence | Grid String | Color1 | Color2 | Color3 | Color4 |
|---|---|---|---|---|---|---|---|
| pjbiocco | vbai@gmail.com | XK|^=Y6rI(l)jBFUv5 | Q58OW'XK|^=Yy%;<br>Ye'JP.j*L(i)6rIt~*AKSGEmf%tjBFUv5<L... | rgb(255, 0, 0) | rgb(255, 0, 0) | rgb(255, 0, 0) | rgb(255, 0, 0) | authenticationtest-23d7c
- pjbiocco
  - ColorInfo
  - Email: "vbai@gmail.com"
  - Grid: "Q58OW'XK|^=Yy%;Ye'JPJj*L{l)6rIt~*AKSGEmf%tjBFUv..."
  - Password: "XK|^=Y6rI(l)jBFUv5"
  - User: ["pjbiocco"] ×

FIG. 4

AUTHENTICATION SYSTEMS USING SEQUENCES OF TILE SELECTIONS FROM A GRID

RELATED APPLICATIONS

This application claims the benefit of U.S. Provisional Patent Application Ser. No. 62/700,953, filed Jul. 20, 2018, the disclosure of which is incorporated herein by reference in its entirety.

TECHNICAL FIELD

This specification relates generally to authentication by computer systems and in particular to authenticating users by grid passwords.

BACKGROUND

User authentication enables secure access to private data, be it an individual's data or corporate data. One of the most common forms of authentication is a password, despite efforts to create effective systems that use stronger alternative forms of authentication. Self-created passwords have been found to be easier to remember than randomly generated passwords. However, user-created passwords are more easily compromised via offline password attacks, including but not limited to dictionary attacks, permutation attacks, and user information attacks. While, randomly generated passwords are more resistant to offline attacks, they have been deemed by users to be harder to remember. User-created passwords that need to meet defined criteria (e.g. minimum length, numbers, special characters) have been found to be weaker, as they often are based on personal information or repeated across multiple platforms.

SUMMARY

This specification describes methods, systems, and computer readable media for authenticating to a computer system. In some examples, a method includes receiving a request from a user device for authentication, the request specifying a username. The method includes determining grid information associated with the username by accessing a repository of grid information for usernames, the grid information specifying a color set. The method includes sending the color set to the user device, causing the user device to display a grid of colored tiles, each colored tile having a color specified by the color set. The method includes receiving a sequence of tile selections from the user device, each tile selection specifying a user selection of one of the colored tiles. The method includes granting or rejecting the request for authentication based on the sequence of tile selections and the grid information associated with the username.

The computer systems described in this specification may be implemented in hardware, software, firmware, or any combination thereof. In some examples, the computer systems may be implemented using a computer readable medium having stored thereon computer executable instructions that when executed by the processor of a computer control the computer to perform steps. Examples of suitable computer readable media include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 4 shows two examples of storing grid authentication information;

DETAILED DESCRIPTION

Figures 1A, 1B:
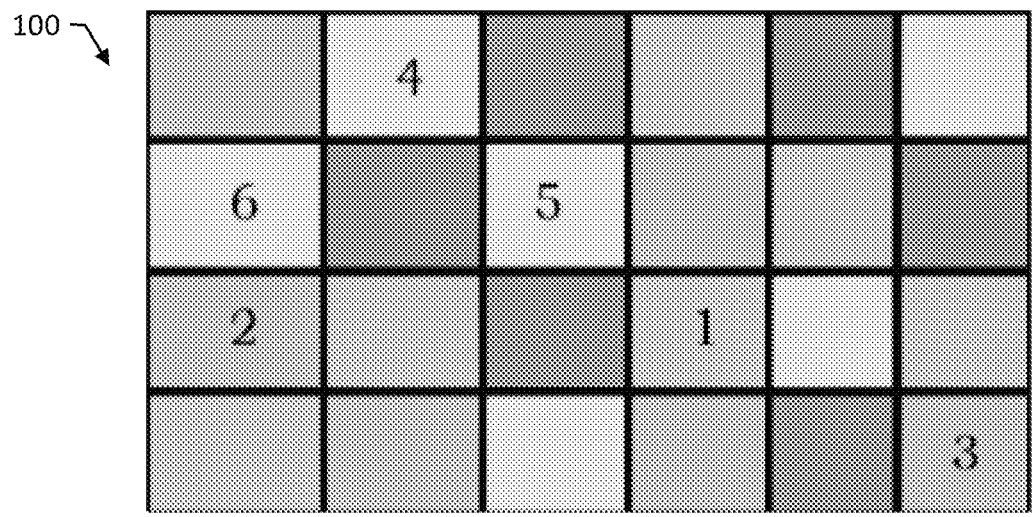
FIG. 1A shows an example grid of colored tiles as viewed from a user's perspective on a user device.
FIG. 1B shows a representation of an example grid from the perspective of the authentication system.

This specification describes methods, systems, and computer readable media for authenticating to a computer system. In some examples, a sequence of tile selections from a grid of colored tiles is used to replace a conventional password. A standard user interface (UI) for authentication can be replaced with a username and an interactive grid instead of a password.

For example, in some cases, an authentication system generates an invisible password, based on the sequence of tile selections, to authenticate a user. The generated password can be, e.g., at least eighteen characters long, including both alphanumeric characters and symbols, created by a sequence of clicks on tiles in a grid. Each tile of the grid can be assigned a sequence of characters. Due to the random nature of the password generation and the length of the resulting password, the disclosed approach yields a secure authentication system, which is readily memorable by users.

In some examples, there are four parts to implementing a grid-based authentication system: username, an optional seed number, representative characters, and password. In another variation, a random number generator is used instead of a seed number. The user's password is generated through the combination of the representative characters, concatenated in the order each tile was clicked by the user.

The grid presented to the user can vary in size, depending on the needs of the system. The grid can be structured such that it is 4×6 (i.e., 4 rows and 6 columns), or 6×4. Alternately, the grid can be 5×5, 3×7, 7×3, 3×8, 8×3, 4×7, 7×4 or other dimensions that provide enough tiles to generate a password of targeted length or complexity.

The authentication system can, in some cases, use less storage space than comparable systems using graphical passwords. For instance, the use of only singular colors in the grid can be represented in hexadecimal values and strings (e.g., 16 bytes of information) and does not require reference to a stored image, which uses substantially more storage space.

In addition, servers using graphical passwords must make requests for every login session to provide specific images to a user. Not much space is required if there are only a few images stored within the server, but then the user is not given a choice, which enables mass phishing attacks. If many images are provided to a user, the server needs to find and produce each of those offered images, which takes up server space, enabling 'denial of service' attacks which forces a server to use all its resources at once. The authentication systems described in this specification allow for a full spectrum of hexadecimal generated colors, which provides enough visual variation to avoid mass phishing attacks.

The authentication system can employ a grid of colors, thereby reducing or eliminating any singular defining point of interest, which might lead to a heat map that might arise from a singular or multiple image(s) of more complexity. In addition, clicking six times on a color grid would obviate any heat map that might arise from one or two colors that might provide points of interest.

FIG. 1A shows an example grid 100 of colored tiles as viewed from a user's perspective on a user device. A user device is a computing device including at least a display and a user input device, e.g., a touchscreen or a mouse or a touchpad. The user device is configured for displaying the grid of colored tiles and receiving a user's input specifying a sequence of tile selections.

The example grid 100 shown in FIG. 1A has four rows and six columns of colored tile. Each tile is a square and includes a border and a color that completely fills the space within the border. Although squares are shown in this example, in general, any appropriate shape can be used, e.g., other sizes of rectangles.

FIG. 1A also shows an example sequence of tile selections by placing numbers into some of the tiles. The numbers represent the order of tile selections by the user, i.e., 1=first selection, 2=second selection, and so on. A user can make tile selections, e.g., by mouse clicks or by tapping on tiles on a touch screen. In general, the numbers are not actually shown on the user device; the numbers shown in FIG. 1A are for illustrating the sequence of tile selections. A tile selection can be represented in the authentication system using any appropriate data type, e.g., as a (row, column) coordinate.

The tiles of the grid can come in a variety of colors or patterns. For example, tiles can be colored by a similar shade and/or hue. In another example, tiles are colored by analogous colors. In another example, the tiles are monochromatic, e.g., derived from a single base hue and extended using shades, tones (achieved by adding a darker color such as grey or black) and tints (achieved by adding white), including by not limited to a greyscale.

In some examples, contrasting colors, e.g., colors opposite one another in the color wheel, are used for the tiles. In yet another embodiment, tiles have different patterns (e.g., plaid, striped, polka dots, paisley, houndstooth, and so on.) Alternately, tiles can combine colors and patterns. In one variation, the user can select the color scheme of the grid; in another, the system uses a color scheme provided by the system. In some examples, the user can select from a sample of color schemes provided by the system.

In some examples, the system is configured to enable the user to make design changes at the discretion of the user. For example, in some cases the location of uniquely colored tiles are not changed between enrollment/logins. In this way, the user has a fixed recognition of their grid, reducing the possibility of phishing attacks. Since only an authentic website would be able to reproduce a user's grid coloration, users can determine a website's authenticity through their login system.

FIG. 1B shows a representation of an example grid 120 from the perspective of the authentication system. The authentication system, in some examples, converts the sequence of tile selections into a generated password using a grid character set. The grid character set specifies, for each tile, a sequence of alphanumeric characters. For example, the upper left tile of the grid 120 shown in FIG. 1B corresponds to "Adi." In some examples, the grid character set includes other special characters.

Converting the sequence of tile selections into the generated password includes translating each tile selection into a portion of the generated password using the grid character set. Then, the portions of the generated password are concatenated in order of the sequence of tile selections. For example, the generated password corresponding to the sequence and character set shown in FIG. 1B would be fyf%2tbnmducqpk%ma.

Figure 2:
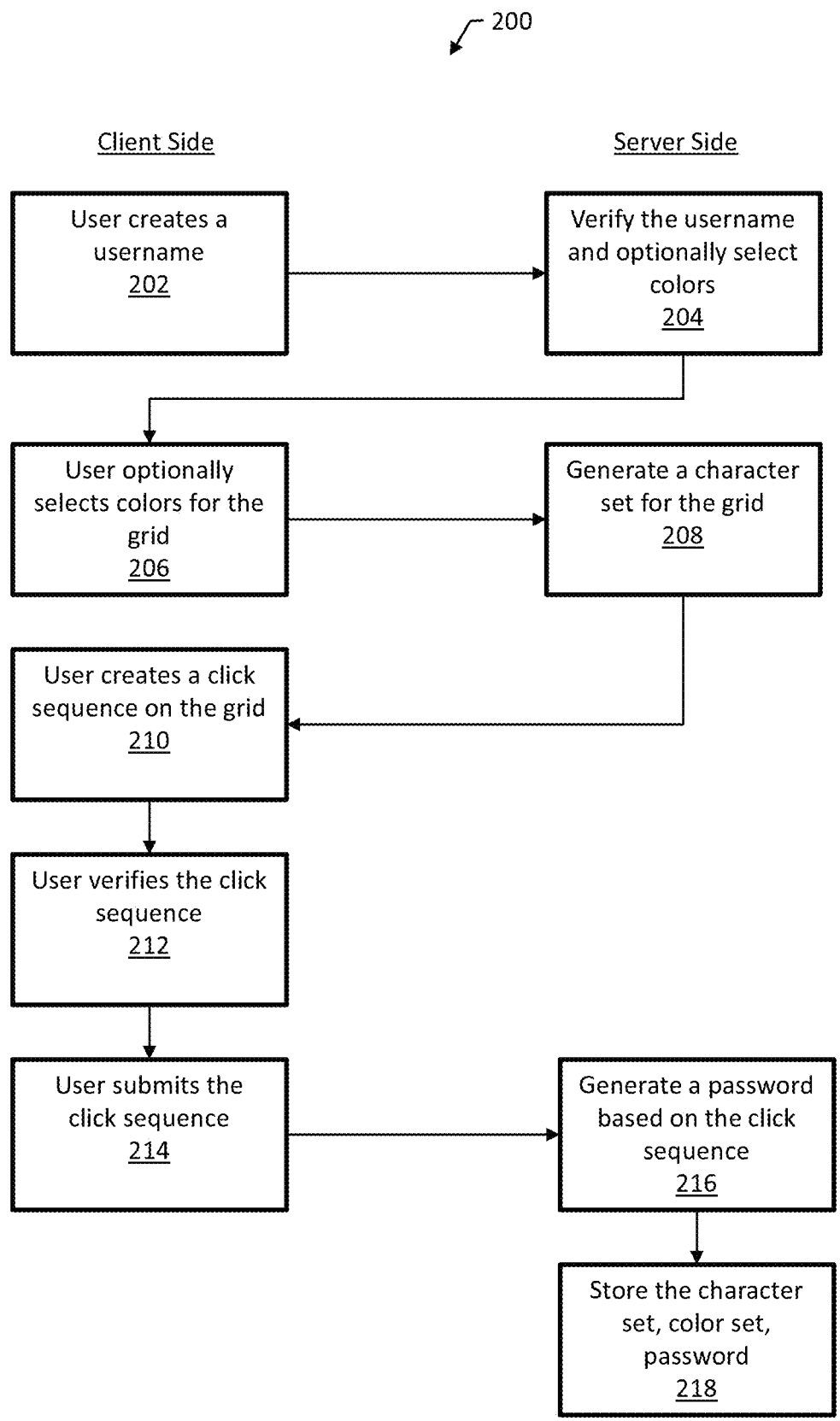
FIG. 2 is a flow diagram illustrating an example method for registering a user for authenticating to a grid-based authentication system.

FIG. 2 is a flow diagram illustrating an example method 200 for registering a user for authenticating to a grid-based authentication system. The flow diagram shows operations performed at a user device (client side, on the left) and operations performed at a server (server side, on the right). The server is a computer system configured to communicate over a data communications network and provide authentication services.

The method 200 includes creating a username by the user at the user device (202). For example, the server can send a graphical user interface (GUI) form to the user device, such as a web page, with a prompt for a username and a text entry box. The user can then enter a desired username in the text entry box. The user can optionally also supply an email address or other user identifiers such as social media user identifiers, or the email address or other type of user identifier can be used as the username.

The method 200 includes verifying, at the server, the username and optionally selecting a color set for the username (204). Verifying the username can include checking the username against a repository of grid information to confirm that the username is unique. If another entry for the username is already stored in the repository, the server can reject the username and prompt the user for a different username.

In some examples, the server automatically creates a color set for the username; in some other examples, the user selects a color set for the username. The color set is the set of colors that specify, for each tile within a grid, a color for the tile, e.g., a color to fill the tile completely or to fill the tile completely within a border. If the user selects the color set, then the method 200 includes selecting, at the user device, the color set for the grid (206).

For example, the server can send a GUI form to the user device to present a color selection grid with candidate tiles to the user and a color-selector user interface element. The user can then select each tile and a color for each tile, and the user device sends the color set to the server. The server stores the color set in the repository of grid information and associates the color set with the username.

The method 200 includes generating, at the server, a character set for the grid (208). The character set specifies, for each tile, a sequence of alphanumeric characters. For example, generating the character set can include generating a seed value unique to the username within the repository of grid information and using the seed value to generate the character set. In general, the server can generate the character set using any appropriate technique, e.g., by using a pseudo-random number generator. The server can enforce a minimum length for the character set, e.g., by producing at least three characters for each tile.

The method 200 includes creating, at the user device, a sequence of tile selections, e.g., as a click sequence, for the tiles on the grid (210). For example, the server can send a GUI form to the user device to present a sequence selection grid with candidate tiles to the user and instructions for the user to enter a sequence. Although sequence numbers are not typically displayed during the authentication process, sequence numbers can, in some examples, be displayed on the grid during registration to aid the user. For example, the server can send a sequence selection script to the user device, causing the user device to display a sequential number over each selected candidate tile in response to the user selecting tiles.

The method 200 optionally includes verifying, at the user device, the click sequence (212). For example, the user device can prompt the user to re-enter the click sequence and then compare the re-entered click sequence to the initially-entered click sequence to confirm that they match. If they do not match, the user device can prompt the user to enter a new click sequence.

The method 200 includes submitting, from the user device to the server, the click sequence for the username (214). In some examples, the server is configured to compare the click sequence to a number of click sequences deemed insecure, e.g., all in the same row or column or all on the same tile. If the click sequence matches one of the click sequences deemed insecure, then the server rejects the click sequence, e.g., by prompting the user to enter a new click sequence.

The server can be configured to enforce a minimum length of the click sequence. For example, the server can reject any click sequences that do not include at least six tile selections.

The method 200 includes, at the server, generating a password based on the click sequence (216). For example, generating the password can include converting the click sequence into a generated password using the grid character set by translating each tile selection into a portion of the generated password using the grid character set. Then, the portions of the generated password are concatenated in order of the sequence of tile selections.

The method 200 includes, at the server, storing the grid character set, the color set, and the password in a repository of grid information (218). The server associates the character set, color set, and password with the username, e.g., in a relational database or other appropriate data structure.

The grid information, or portions of the grid information such as the character set, can be encrypted or hashed using any appropriate algorithm. For example, the password, seed value, and username can be secured using a one-way hashing function. Additional security measures, including but not limited to salting and Kerberos, can also be applied to the system using techniques familiar to those of skill in the art.

In general, the information exchanges between the user device and the server are protected using, e.g., public key encryption or other appropriate technology. For example, RSA can be used for secure transmission of the user name the sequence of tile selections.

Figure 3:
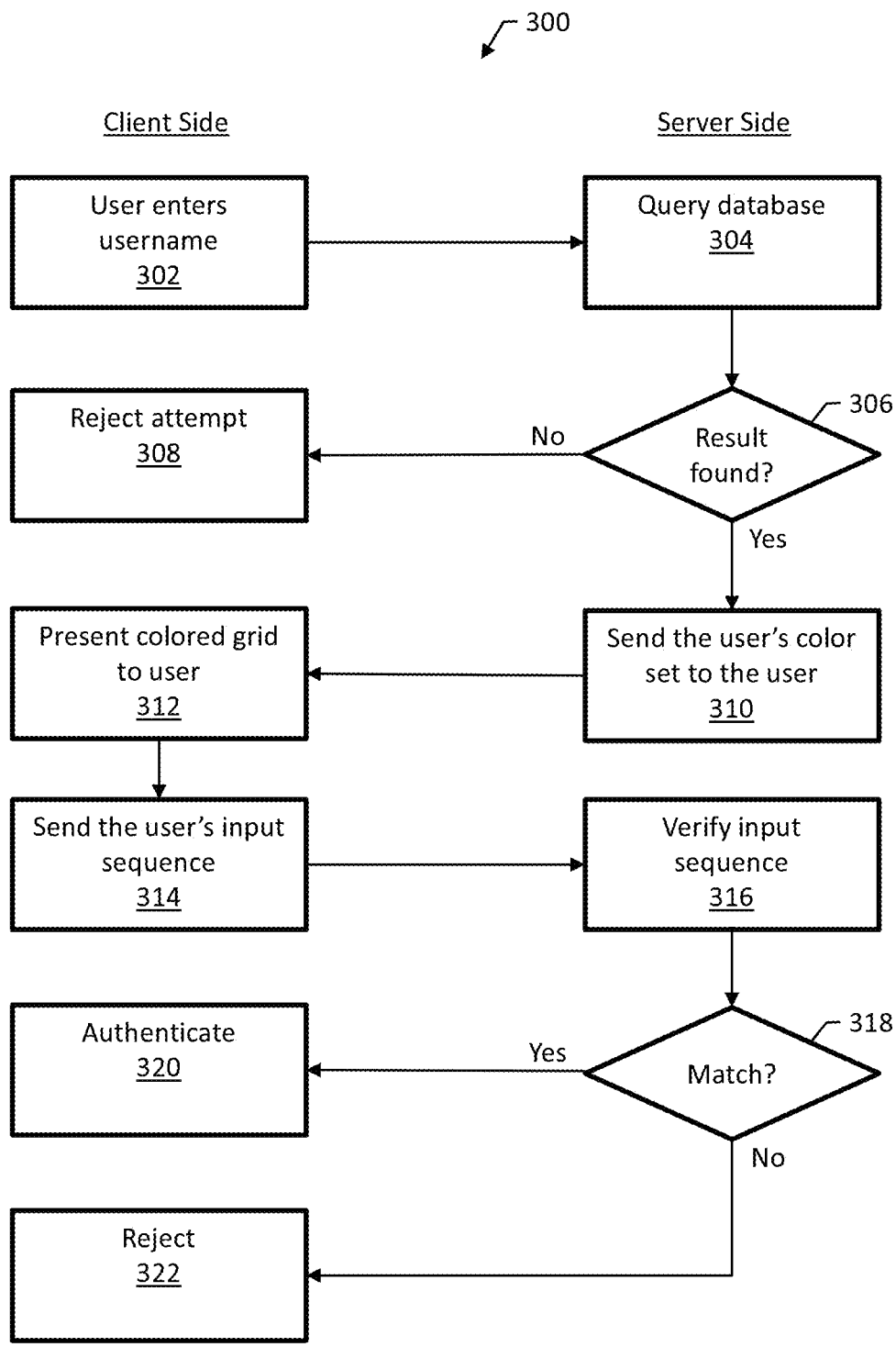
FIG. 3 is a flow diagram of an example method for authenticating to a grid-based authentication system.

FIG. 3 is a flow diagram of an example method 300 for authenticating to a grid-based authentication system. The flow diagram shows operations performed at a user device (client side, on the left) and operations performed at a server (server side, on the right). The method 300 can be used for authentication after registration, e.g., after a user has registered to the authentication system using the method 200 of FIG. 2.

The method 300 includes, at the user device, receiving user input specifying a username (302). For example, the user can enter the username into a text box or select the username from a list of usernames populated on the user device. In some examples, the server sends a GUI form to the user device including a username input element. The user device sends the username to the server along with or as a request for authentication.

The method 300 includes, at the server, querying a repository of grid information, e.g., a database, for the username (304). The method 300 includes, at the server, determining whether the username is in the repository (306), and if not, rejecting the authentication request (308), e.g., by sending a rejection message to the user device for display to the user.

The method 300 includes sending, from the server to the user device, the color set associated with the username to the user device (310). The method 300 includes displaying, at the user device, a grid of colored tiles, each colored tile having a color specified by the color set (312). For example, the server can send a GUI form to the user device to present the grid of colored tiles to the user and instructions for the user to enter the sequence for the username.

The method 300 includes, at the user device, receiving user input specifying a sequence of tile selections and sending the sequence of tile selections to the server (314). Each tile selection specifies a user selection of one of the colored tiles in the order that the user selected the tiles. Typically, sequence numbers are not displayed on the tiles during the authentication process. In some examples, the display of the grid is changed as the user enters the sequence of tile selections, e.g., by briefly flashing each selected tile as it is selected to confirm the user's input.

The method 300 includes, at the server, verifying the sequence of tile selections and granting or rejecting the request for authentication based on the sequence of tile selections and a stored password associated with the username (316). The method 300 includes, at the server, determining whether the sequence of tile selections matches grid information stored and associated with the username (318). For example, the server can convert the sequence of tile selections into a password using a character set associated with the username and then compare the generated password to the stored password.

If the sequence matches, then the method 300 includes granting the authentication request (320). If the sequence does not match, the method 300 includes rejecting the authentication request (322). Inputting an incorrect sequence can result in a temporary account lockout or can result in rejecting login attempts for a designated time FIG. 4 shows two examples of storing grid authentication information. The grid authentication information includes a username, an email address, a click sequence, a grid string (or character set for corresponding tiles to alphanumeric sequences), and a color set. On the top is an example SQL entry in a grid authentication database. On the bottom is a firebase storage example as an alternative to SQL.

In general, any appropriate data storage technology can be used at the server to store grid authentication information. In some examples, the password, i.e., the character string, is hashed along with the username and stored.

Figure 5A:
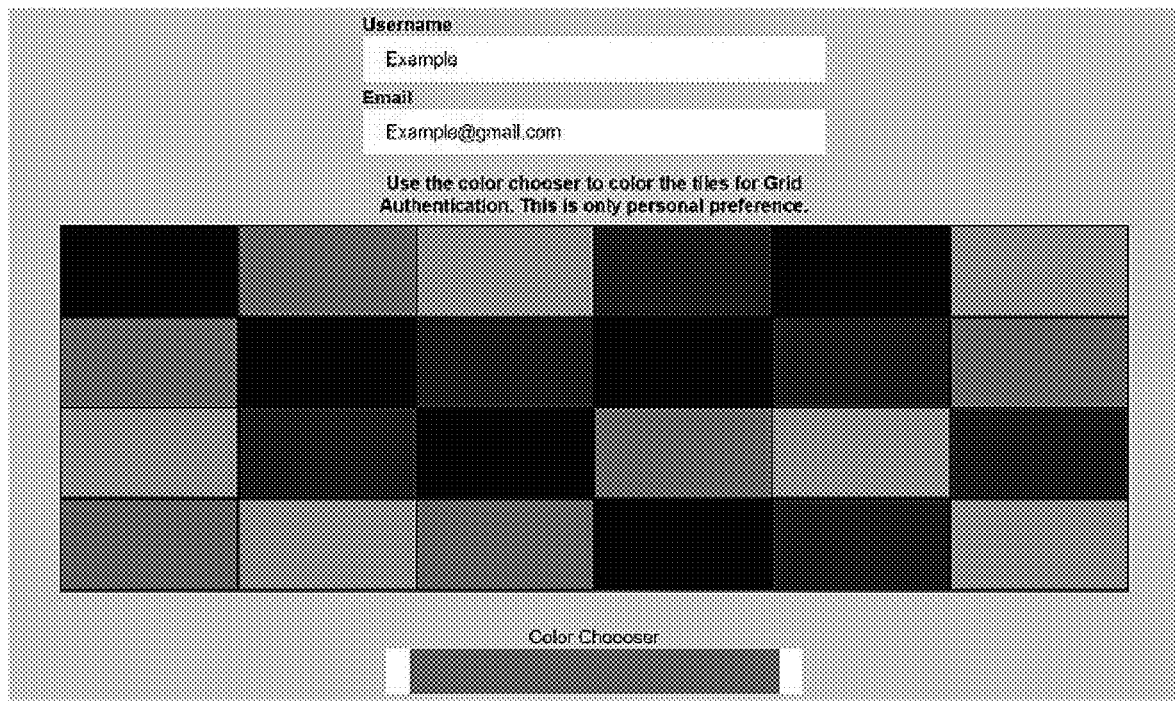
FIG. 5A shows an example GUI form for selecting a color set during registration with an authentication system.
Figure 5B:
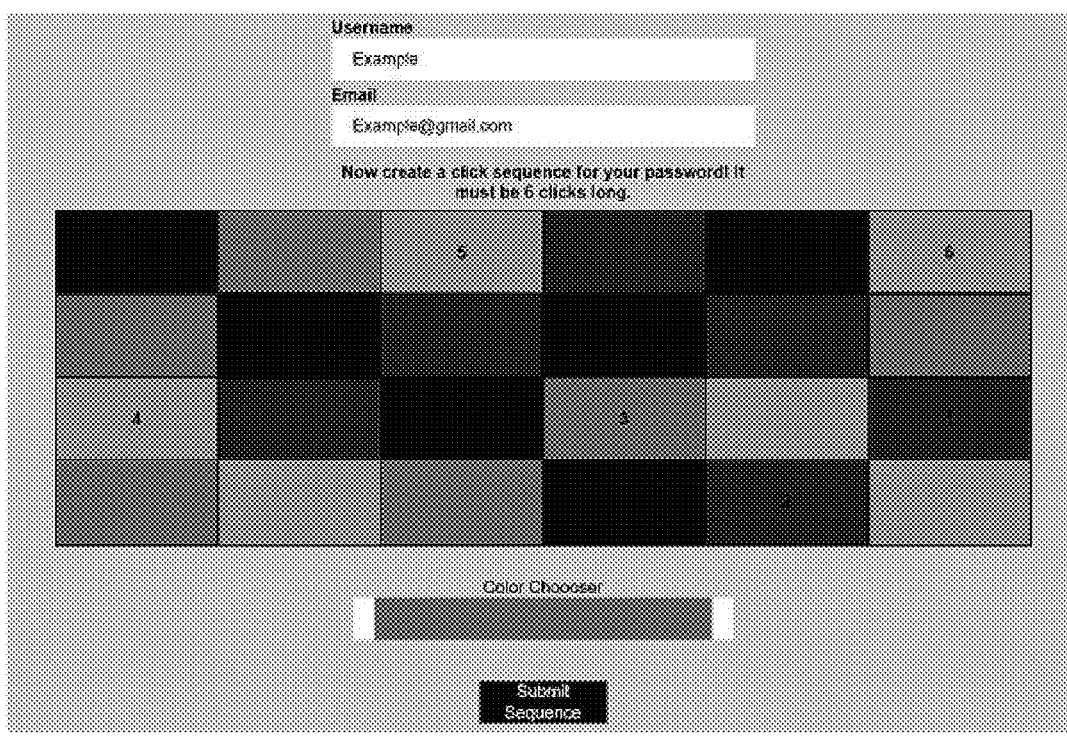
FIG. 5B shows an example GUI form for selecting a tile selection sequence during registration with an authentication system.

FIG. 5A shows an example GUI form for selecting a color set during registration with an authentication system. FIG. 5B shows an example GUI form for selecting a tile selection sequence during registration with an authentication system. The GUI forms can be implemented, e.g., as web pages or as built-in screens to user device applications or using any appropriate technology.

Offline password attacks such as brute force attacks, rainbow tables, dictionary attacks, and hybrid attacks are ineffective against strong and long passwords. As disclosed herein, the grid framework authentication generates a random eighteen-character long password, which is then hashed.

The authentication systems described in this specification can be effectively resistant to hacking. Cracking a password generated from a sequence of size six via brute force requires using 397 decillion combinations ($95^{18}$), i.e., selecting the correct character out of 95 characters located on the keyboard, eighteen times in a row. Both dictionary attacks and hybrid attacks, both of which are used when targeting passwords with dictionary-based words, are stymied due to the random nature of grid generated passwords. Cracking a grid-generated password with a rainbow table is too computationally intensive, i.e., require 397 decillion hashes to be computed and recorded for six user inputs.

Hacking a stored password would not be sufficient to decipher the input sequence entered into the grid. Specifically, if the password was cracked, the attacker would then need to break down the password into its subparts and associate each subpart with the correct tile on the grid. Since the characters cannot be seen by the user, the attacker would have to decrypt the 72-character long representative character content string. Without this, hacking the stored password would not be sufficient to decipher the input sequence to be entered through the grid.

The authentication process can be resistant to keylogging malware. A username could maybe be revealed via keylogging, but inputting the grid sequence typically uses a mouse or touchpad, which cannot be reproduced by keylogging malware.

Additionally as disclosed herein, the authentication system guards against mass phishing attacks (i.e., using a fake duplicate site to gather passwords) because users can create their own recognizable color scheme, so they can distinguish their color palette from a fake site. Alternately, if the color scheme from the fake site does not duplicate the grid known to the user, they might not be able to reliably enter their own password.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for authenticating a computer system, the method comprising:
    receiving, at a server, a request from a user device for authentication, the request specifying a username, wherein receiving the request from the user device for authentication comprises:
        sending a first graphical user interface (GUI) form to the user device, the first GUI form including a username input element;
    determining, at the server, grid information associated with the username by accessing a repository of grid information for a plurality of usernames, the grid information specifying a color set;
    sending, from the server, the color set to the user device, causing the user device to display a grid of a plurality of colored tiles, each colored tile having a color specified by the color set, wherein sending the color set to the user device comprises:
        sending a second GUI form to the user device after receiving the request from the user device for authentication, the second GUI form displaying the grid of the plurality of colored tiles, and wherein sending the second GUI to the user device comprises:
            sending a script for execution on the user device to capture a sequence of tile selections as a sequence of user clicks on the grid of the plurality of colored tiles;
    receiving, at the server, the sequence of tile selections from the user device, each tile selection within the sequence of tile selections specifying a user selection of one of the colored tiles; and
    granting or rejecting the request for authentication based on verification of the sequence of tile selections and the grid information associated with the username.

2. The method of claim 1, wherein the grid information includes a grid character set specifying, for each colored tile, a sequence of alphanumeric characters.

3. The method of claim 2, wherein granting or rejecting the request for authentication based on the sequence of tile selections and the grid information associated with the username comprises converting the sequence of tile selections into a generated password by: translating each tile selection within the sequence of tile selections into a portion of the generated password using the grid character set; and concatenating the portions of the generated password in order of the sequence of tile selections.

4. The method of claim 3, wherein the grid information includes a stored password, and wherein granting or rejecting the request for authentication based on the sequence of tile selections and the grid information associated with the username comprises comparing the stored password with the generated password.

5. The method of claim 2, wherein each sequence of alphanumeric characters of the grid character set is at least three characters long, and wherein the sequence of tile selections includes at least six tile selections.

6. The method of claim 1, comprising, before receiving the request from the user device for authentication, registering the username and the grid information.

7. The method of claim 1, wherein registering the username comprises: sending a graphical user interface (GUI) form to the user device, the GUI form presenting a color selection grid comprising a plurality of candidate tiles; and receiving, for each candidate tile, a user-selected color for the candidate tile and storing the user-selected colors as the color set associated with the username.

8. The method of claim 1, wherein registering the username comprises: sending a graphical user interface (GUI) form to the user device, the GUI form presenting a sequence selection grid comprising a plurality of candidate tiles; and sending a sequence selection script to the user device, causing the user device to display a sequential number over each selected candidate tile of a plurality of selected candidate tiles in response to the user selecting candidate tiles.

9. The method of claim 1, wherein registering the username comprises receiving a candidate sequence of tile selections and rejecting the candidate sequence of tile selections as a result of the candidate sequence of tile selections matching a sequence of tile selections deemed insecure.

10. The method of claim 1, wherein registering the username comprises generating a seed value unique to the username within the repository of grid information and using the seed value to generate a grid character set specifying, for each colored tile, a sequence of alphanumeric characters.

11. A method for authenticating a computer system, the method comprising:
sending, from a user device, a username to a server, wherein sending the username to the server comprises:
receiving a first graphical user interface (GUI) form from the server, the first GUI form presenting a username prompt; and
receiving user input specifying the username;
receiving, at the user device, a color set from the server and presenting a grid of a plurality of colored tiles, each colored tile having a color specified by the color set, wherein the grid is associated with the username and wherein receiving the color set from the server and presenting the grid of the plurality of colored tiles comprises:
receiving, from the server, a second GUI form after the user device sends a request for authentication, wherein the second GUI form displays at the user device the grid of the plurality of colored tiles, and
sending, from the server, a script for the user device to capture the sequence of tile selections as a sequence of user clicks on the grid of the plurality of colored tiles, and the user device executing the script;
receiving, at the user device, user input specifying a sequence of tile selections, each tile selection within the sequence of tile selections specifying a user selection of one of the colored tile; and
sending, from the user device, the sequence of tile selections to the server;
receiving from the server, at the user device, an indication; and
based on the indication, granting or rejecting the request for authentication based on verification of the sequence of tile selections and the grid associated with the username.

12. A server for authenticating a computer system, the server comprising:
one or more processors and memory storing executable instructions for the processors; and
an authenticator implemented on the processors and memory, the authenticator configured for performing operations comprising:
receiving a request from a user device for authentication, the request specifying a username, wherein receiving the request from the user device for authentication comprises:
sending a first graphical user interface (GUI) form to the user device, the first GUI form including a username input element;
determining grid information associated with the username by accessing a repository of grid information for a plurality of usernames, the grid information specifying a color set;
sending the color set to the user device, causing the user device to display a grid of a plurality of colored tiles, each colored tile having a color specified by the color set, wherein sending the color set to the user device comprises:
sending a second GUI form to the user device after receiving the request from the user device for authentication, the second GUI form displaying the grid of the plurality of colored tiles, and wherein sending the second GUI to the user device comprises:
sending a script for execution on the user device to capture a sequence of tile selections as a sequence of user clicks on the grid of the plurality of colored tiles;
receiving the sequence of tile selections from the user device, each tile selection within the sequence of tile selections specifying a user selection of one of the colored tiles; and
granting or rejecting the request for authentication based on verification of the sequence of tile selections and the grid information associated with the username.

13. The server of claim 12, wherein the grid information includes a grid character set specifying, for each colored tile, a sequence of alphanumeric characters.

14. The server of claim 12, wherein granting or rejecting the request for authentication based on the sequence of tile selections and the grid information associated with the username comprises converting the sequence of tile selections into a generated password by: translating each tile selection within the sequence of tile selections into a portion of the generated password using the grid character set; and concatenating the portions of the generated password in order of the sequence of tile selections.

* * * * *